US005535975A

United States Patent [19]

Scott

[11] Patent Number: 5,535,975

[45] Date of Patent: Jul. 16, 1996

[54] CUSHION FOR REMOVABLE ATTACHMENT TO RIGID, PLANAR SUPPORTS

[76] Inventor: Walter B. Scott, 1809 E. 7th St., Superior, Wis. 54880

[21] Appl. No.: 125,923

[22] Filed: Sep. 23, 1993

Related U.S. Application Data

[63] Continuation-in-part of Ser. No. 34,071, Mar. 22, 1993, Pat. No. 5,375,552, which is a continuation-in-part of Ser. No. 601,030, Oct. 19, 1990, Pat. No. 5,195,763, which is a continuation of Ser. No. 264,995, Oct. 31, 1988, abandoned.

[51] Int. Cl.[6] .......... F16M 13/00

[52] U.S. Cl. .......... 248/346.01; 248/205.2; 248/118.1

[58] Field of Search .......... 248/346, 345.1, 248/633, 205.2, 118, 118.1, 918, 678, 506, 510; 182/230; 5/420, 417, 922; 280/32.6, 32.5, 18; 451/533, 539, 526

[56] References Cited

U.S. PATENT DOCUMENTS

| | | | |
|---|---|---|---|
| 351,790 | 11/1886 | Paton . | |
| 1,104,398 | 7/1914 | Zimmerman . | |
| 1,529,498 | 3/1925 | Novak | 182/230 |
| 1,976,170 | 10/1934 | Hoover et al. | 182/230 |
| 2,052,973 | 9/1936 | Furtzaig | 182/230 |
| 2,472,185 | 6/1949 | Apel . | |
| 2,576,455 | 11/1951 | Gratt . | |
| 2,596,547 | 5/1952 | Guest . | |
| 2,614,273 | 10/1952 | Yancofski . | |
| 2,843,391 | 7/1958 | Pelletier . | |
| 3,065,020 | 11/1962 | Cox . | |
| 3,129,540 | 4/1964 | Valles | 451/533 X |
| 3,308,490 | 3/1967 | Cacioppo . | |
| 3,336,610 | 8/1967 | Geddings | 5/420 |
| 3,370,818 | 2/1968 | Perr . | |
| 3,414,928 | 10/1968 | Lemelson | 451/539 X |
| 3,446,531 | 5/1969 | Froelich . | |
| 3,499,502 | 3/1970 | Rosander | 182/230 |
| 3,540,160 | 11/1970 | De Rose et al. | 451/526 X |
| 3,544,054 | 12/1970 | Ward | 182/230 |
| 3,982,748 | 9/1976 | Hooper et al. . | |
| 4,037,591 | 7/1977 | Sarno | 5/922 X |
| 4,244,594 | 1/1981 | Hines . | |
| 4,260,440 | 4/1981 | Frankenberg . | |
| 4,266,707 | 5/1981 | Rossman . | |
| 4,317,244 | 3/1982 | Balfour-Richie . | |
| 4,405,142 | 9/1983 | Whetstine . | |
| 4,450,193 | 5/1984 | Staebler . | |
| 4,549,323 | 10/1985 | Brockhaus . | |

(List continued on next page.)

OTHER PUBLICATIONS

MEC–MAT publication, Spectra Automotive Industrial Supplies Inc., 647 W. Foothill Blvd., #144 Upland, GA 91786.

*Primary Examiner*—Karen J. Chotkowski

*Attorney, Agent, or Firm*—Peterson, Wicks, Nemer & Kamrath

[57] ABSTRACT

A cushion which can be removably attached to rigid, planar supports is disclosed according to the preferred teachings of the present invention including a flexible insulator removably received within a flexible bag-like covering. The insulator in its preferred form includes first and second reflective layers sandwiching sealed, multiple air cell material. The cushion has a size and shape complementary to the top surface of the support and can be removably held thereon by fasteners which in the preferred form are VELCRO® fasteners secured to the bottom surface of the covering and the top surface of the support such as by double-sided adhesive tape whereby the cushion is located intermediate the support and the user kneeling, laying or otherwise supported thereon. Flexible abrasive strips are further secured to the bottom surface of the covering and intermediate the fasteners to prevent slipping of the cushion upon the work area. In a first preferred form, the cushion is approximately one-half the size of the support, with the user kneeling on the cushion while the remaining portions of the support hold repair tools. A handle in the form of a cord extends through apertures formed in the support adjacent its top end. In another preferred form, the cushion includes three portions, which can be folded for storage, with each of the portions including abrasive strips parallel to the fold lines.

16 Claims, 2 Drawing Sheets

U.S. PATENT DOCUMENTS

| | | | |
|---|---|---|---|
| 4,624,022 | 11/1986 | Dolan . | |
| 4,658,452 | 4/1987 | Brockhaus . | |
| 4,671,568 | 6/1987 | Greer . | |
| 4,723,300 | 2/1988 | Aranow . | |
| 4,726,083 | 2/1988 | Hoshall . | |
| 4,777,681 | 10/1988 | Luck et al. . | |
| 4,805,244 | 2/1989 | Scott . | |
| 4,880,198 | 11/1989 | Brewer | 248/346 |
| 5,134,809 | 8/1992 | Morton et al. | 451/533 X |
| 5,195,763 | 3/1993 | Scott . | |

CUSHION FOR REMOVABLE ATTACHMENT TO RIGID, PLANAR SUPPORTS

CROSS REFERENCE

The present application is a continuation-in-part of application Ser. No. 08/034,071 filed Mar. 22, 1993 now U.S. Pat. No. 5,375,552 which is a continuation-in-part of application Ser. No. 07/601,030 filed Oct. 19, 1990, now U.S. Pat. No. 5,195,763 which is a continuation of application Ser. No. 07/264,995 filed Oct. 31, 1988, now abandoned.

BACKGROUND

The present invention generally relates to cushions, and particularly to cushions which can be removably attached to rigid, planar supports.

Repair of many types of equipment requires the mechanic or other repair person to kneel or lay on the ground, floor or other work area to effect that repair. It can then be appreciated that the ground, floor or other work area is often not conducive to supporting the mechanic or other repair person especially when such repair is taking place in the field. Specifically, the ground, floor or other work area could be cold and/or wet or could be covered with snow or other types of residue. Further, the ground, floor or other work area could be extremely rough such as covered with gravel, crushed rock, or the like such as along railroad tracks where repair of railroad equipment was being undertaken or along roads where repair of trucks, buses, or other vehicles was being undertaken.

It was very common for mechanics or other repair persons to utilize a piece of cardboard or the like to lie or kneel on. However, while initially such piece of cardboard or the like would help keep the mechanic or other repair person dry and relatively clean, cardboard over time will absorb moisture and other residues and also provides minimal protection against the cold and/or against rough surfaces. Also, cardboard or the like has a tendency to easily slip and slide upon the ground, floor or other work area especially when covered with snow or other types of residue which make the ground, floor or other work area slippery.

Thus, a need exists for cushions upon which the mechanic or other repair person can kneel, lay, or be otherwise supported during repair of equipment, and which can be removably attached to rigid, planar supports allowing securement and removal without the use of tools and being free from projections which would detract from the comfort to the user supported on the support.

SUMMARY

The present invention solves this and other needs and problems in the field of support cushions by providing a flexible cushion of a size complementary to a rigid, planar support and including a lower surface which is releasably secured to the top surface of the support without the use of tools and which is free of projections which would detract from the comfort to the user when the cushion is intermediate the support and the user when the user is supported on the support.

In the preferred form, the cushion is removably secured to the rigid support by fastener portions such as VELCRO® hook and loop fasteners secured to the cushion and to the top surface of the support such that the cushion is intermediate the fastener portions and the user supported on the support.

In the most preferred form, the cushion has a width substantially less than the support and is parallel and adjacent to the top end of the support and parallel to and spaced from the bottom end of the support so that the portion of the support not covered by the cushion can hold repair tools in front of and while the user kneels on the cushion.

In another aspect of the present invention, the flexible cushions include flexible abrasive strips secured to the lower surface of the cushion to prevent slipping of the cushion upon the work area. In a preferred form of the present invention, the cushion is folded into thirds, with each portion including an abrasive strip arranged parallel to the fold lines.

Additionally, in the preferred form, the cushion includes a flexible insulator received within a flexible covering. In its most preferred form, the insulator includes first and second reflective layers sandwiching sealed, multiple air cell material. The reflective layers reflect body heat back to the user and cold away from the user. The air encapsulated in the air cells of the material acts as insulation in reducing heat transfer and provides a resilient, cushion-type support for the user.

It is thus an object of the present invention to provide a cushion for removable attachment to a rigid, planar support.

It is further an object of the present invention to provide such a novel cushion which is free from projections from the top surface of the rigid, planar support.

It is further an object of the present invention to provide such a novel cushion which is securable without the use of tools.

It is further an object of the present invention to provide such a novel cushion including non-slip provisions relative to the work area.

It is further an object of the present invention to provide such a novel cushion which does not require factory installation to the rigid, planar support.

It is further an object of the present invention to provide such a novel cushion which stops chills from entering the area of the back, buttocks, and upper legs of a user.

It is further an object of the present invention to provide such a novel cushion which reflects and retains body warmth.

It is further an object of the present invention to provide such a novel cushion which is thin.

It is further an object of the present invention to provide such a novel cushion which is flexible.

It is further an object of the present invention to provide such a novel cushion which is comfortable.

It is further an object of the present invention to provide such a novel cushion which is moisture proof.

It is further an object of the present invention to provide such a novel cushion which reflects cold away from the user.

It is further an object of the present invention to provide such a novel cushion which is not prone to being pulled from the rigid, planar support by the movement of the user.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
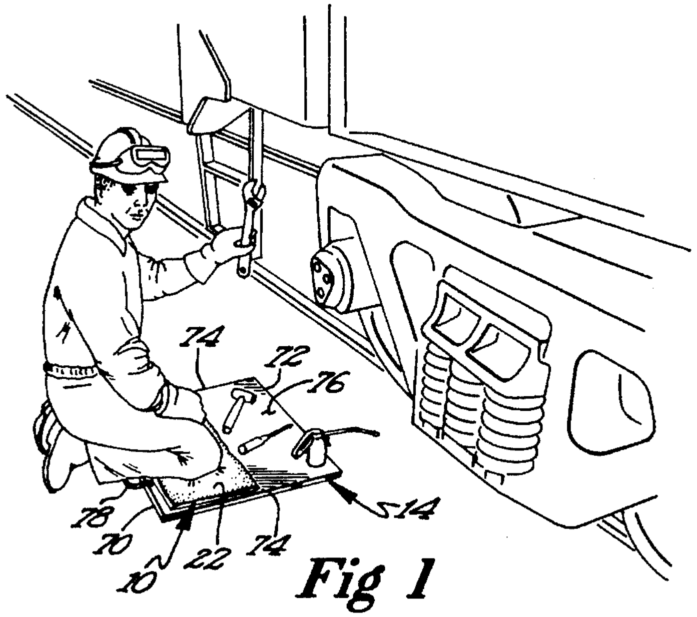
FIG. 1 shows an exploded perspective view of a cushion for removable attachment to a rigid, planar support according to the preferred teachings of the present invention, with portions being broken away.
Figure 2:
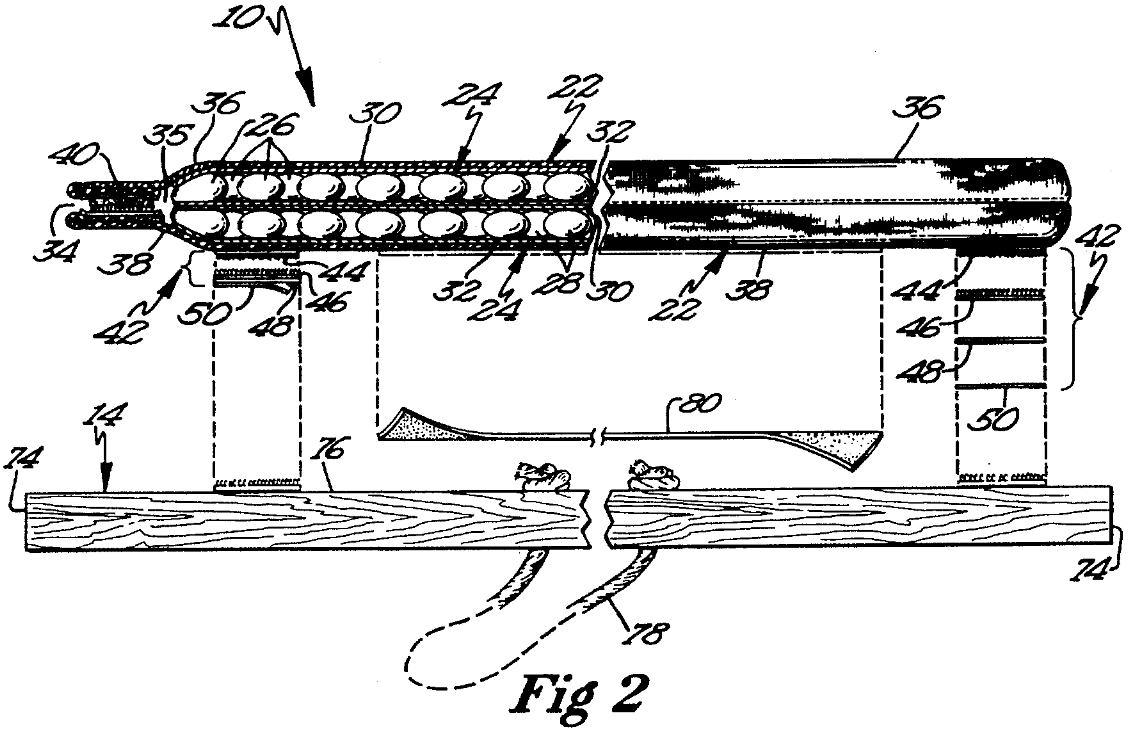
FIG. 2 shows a cross-sectional view of the rigid support cushion of FIG. 1 according to section line 2—2 of FIG. 1.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "inner", "outer", "interior", and similar terms are used herein, it should be understood that these terms have reference only to the structure shown in the drawings as it would appear to a person viewing the drawings and are utilized only to facilitate describing the invention.

DESCRIPTION

A cushion for removable attachment to rigid, planar supports or the like according to the preferred teachings of the present invention is shown in the drawings and is generally designated 10. In the preferred form, support 14 supports the mechanic or other repair person thereon, with the user being supported on support 14 generally either by kneeling or laying thereon. Particularly, support 14 is formed of rigid, planar material such as rigid sheets including but not limited to plywood and has a top end 70, a bottom end 72, and first and second sides 74 around a top surface 76. In the most preferred form, support 12 includes a handle 78 located adjacent top end 70 thereof, with handle 78 in the most preferred form being formed of a flaccid member such as a cord or rope having its opposite ends secured to support 14 adjacent top end 70 and in the most preferred form by having the ends of the rope passing through spaced apertures formed in support 14 and including knots for abutting with the bottom surface of support 14.

Cushion 10 is flexible and includes a flexible covering 22 and a laminated insulator 24. Insulator 24 is thin, soft, lightweight, flexible, cushiony, heat reflective, and moisture proof. Specifically, in the preferred form of the present invention, insulator 24 is formed of layers 26 and 28 of sealed, multiple air cell material sandwiched between first and second metalized plastic sheet or metallic foil or other reflective member or layers 30 and 32. It can then be appreciated that layers 26 and 28 are formed of plastic material and as such do not absorb or hold water. Similarly, layers 30 and 32 do not absorb or hold water. It can further be appreciated that the air encapsulated in layers 26 and 28 acts as an insulator in reducing heat transfer. Similarly, layers 26 and 28 provide a resilient, cushion-type support as the encapsuled air within layers 26 and 28 can be compressed to act in the manner of a shock absorber and spring. In the most preferred form, insulator 24 is one-fourth of an inch (0.64 cm) thick. In the preferred embodiment, two insulators 24 are utilized in an abutting relation in each cushion 10.

Flexible covering 22 is a bag-like component having an open top 34 for receipt of and enclosing insulator 24. Generally, covering 22 includes two halves 36 and 38 having a shape and size corresponding to but slightly larger than insulator 24. Halves 36 and 38 are joined by their side and bottom peripheries such as by stitching. Suitable provisions 40 such as VELCRO® hook and loop type fasteners may be provided for releasably closing open top 34 to allow removable placement of insulator 24 within interior 35 of covering 22.

In its most preferred form, covering 22 may be formed of flexible material such as fabric or vinyl which can be stain and wear resistant, spark and flame resistant, non-static, washable, and comfortable to the touch of the skin of the user. Additionally, covering 22 has a coloring which can be easily seen, with visibility being especially important in work areas adjacent to vehicular or other types of traffic.

Cushion 10 according to the teachings of the present invention has a shape complementary to top surface 76 of support 14 and specifically to support 14 between sides 74 and between top and bottom ends 70 and 72 of support 14.

According to the teachings of the present invention, cushion 10 includes provisions 42 for releasably securing covering 22 to support 14 to allow easy removal without the use of tools. Specifically, in its most preferred form, provision 42 is VELCRO® hook and loop-type fasteners and generally includes a first portion 44 which may be either the hook or loop fastener portion and a second portion 46 which may be the other of the hook or loop fastener portion and which is removably interconnectable to portion 44. In its most preferred form, portion 44 is permanently secured to half 38 of covering 22 forming the lower surface of cushion 10 such as by adhesive or sewing and independent of insulation 24. Suitable provision 48 is further provided to permanently secure portion 46 to top surface 76 of support 14 such as double-sided adhesive tape having a first side adhered to portion 46 and a second side covered by a removable protective covering sheet 50. Thus, after sheet 50 has been removed from tape 48, the second side of tape 48 can be adhered to top surface 76 of support 14. In its most preferred form, two provisions 42 are provided extending generally parallel to and adjacent but spaced from sides 74 of platform 14. Thus, provisions 42 releasably secure cushion 10 to top surface 76 of support 14. Cushion 10 has a thickness generally equal to the thickness of insulator 24, as the thickness of halves 36 and 38 is relatively small, and specifically has a thickness in the range of ⅝ inch (1.59 cm). Cushion 10 according to the teachings of the present invention is lightweight.

In the most preferred form, cushion 10 further includes a flexible, thin, non-slip abrasive strip 80 secured to half 38 of covering 22 forming the lower surface of cushion 10 such as by adhesive or sewing. In the most preferred form, strip 80 is elongated having a length slightly less than cushion 10. Strip 80 has a width which is substantially less and specifically a fraction of its length and specifically of a width in the order of 4 inches (10 cm).

In a first preferred form as shown in FIG. 1, cushion 10 and support 14 support the user kneeling upon cushion 10.

Specifically, support 14 has a width between ends 70 and 72 which is substantially larger and in the most preferred form twice the corresponding dimension of cushion 10, with portions 46 generally extending from top end 70 towards but spaced from bottom end 72. In the most preferred form, support 14 is 32 inches (81 cm) long and 24 inches (61 cm) wide and cushion 10 is 32 inches (81 cm) long and 12 inches (30 cm) wide. Strip 80 has a length to fit intermediate portions 44 secured to cushion 22, and particularly in the order of 22 inches (55 cm).

Figure 3:
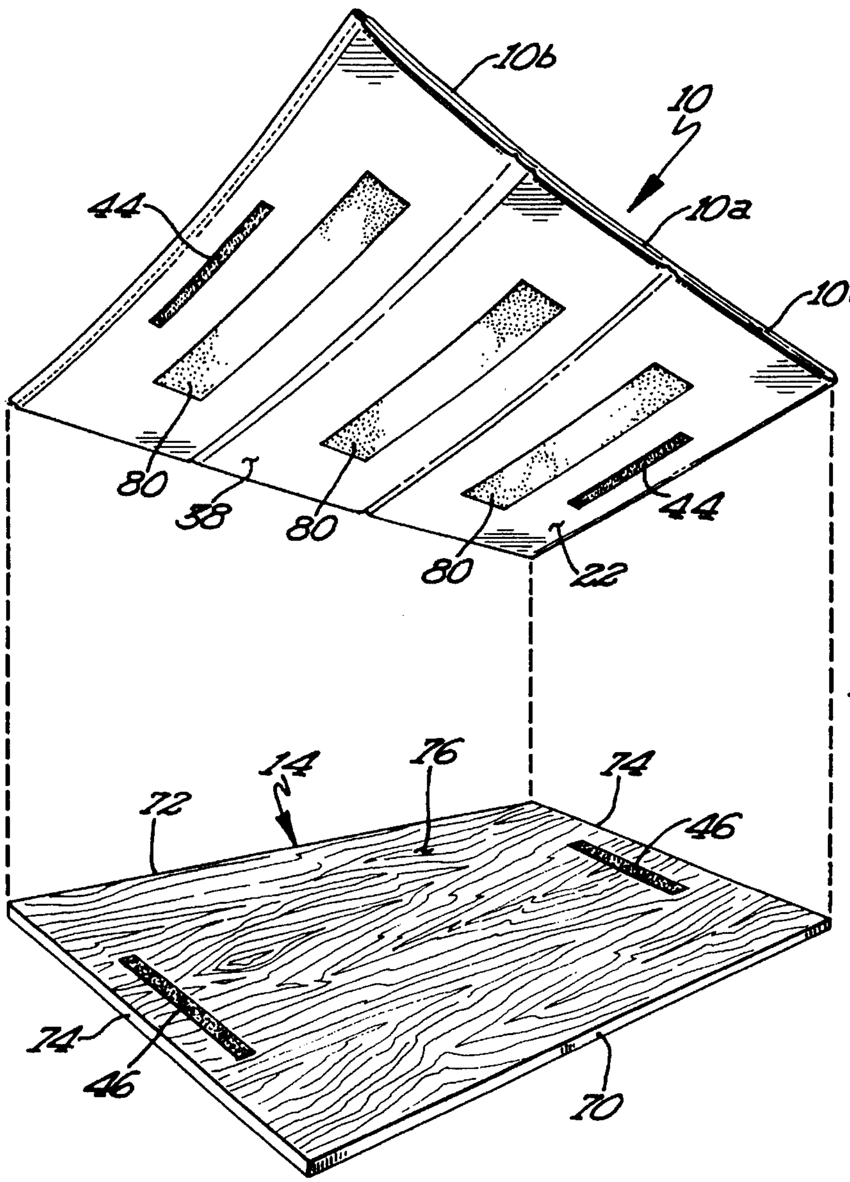
FIG. 3 shows an exploded perspective view of another embodiment of a cushion for removable attachment to a rigid, planar support according to the preferred teachings of the present invention.
Figure 4:
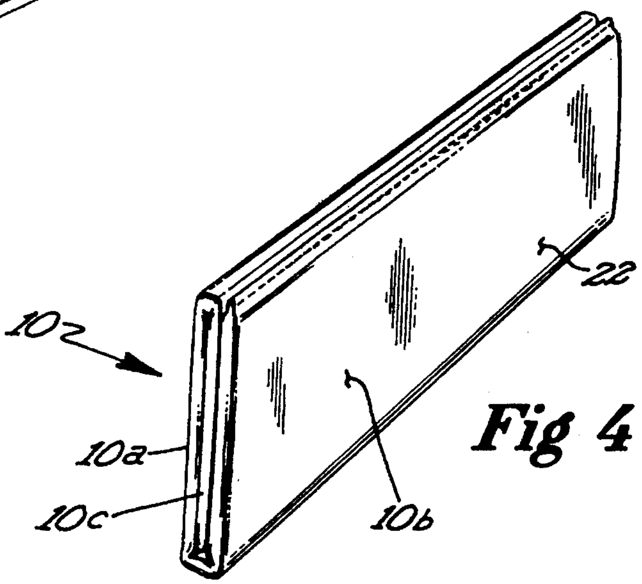
FIG. 4 shows a perspective view of the cushion of FIG. 3 in a folded condition.

In another preferred form as shown in FIG. 3, cushion 10 and support 14 support the user typically laying upon cushion 10. Specifically, support 14 has a width between ends 70 and 72 and a length between sides which is substantially equal to the corresponding dimensions of cushion 10. In the most preferred form, cushion 10 and support 14 are 53 inches (135 cm) long and 35 inches (90 cm) wide. In the most preferred form, cushion 10 is foldable into thirds including a central portion 10*a* including wing portions 10*b* and 10*c* pivotally mounted to the side edges thereof. Cushion 10 can include suitable provisions such as an elastic band to removably hold cushion 10 in its folded condition. In the most preferred form, each of portions 10*a–c* includes strip 80 extending parallel to the fold lines therebetween and has a length less than cushion 10 and particularly in the order of 24 inches (60 cm). Portions 44 are secured to portions 10*b* and 10*c* parallel to and outward of strips 80 and intermediate the edges of cushion 10 and strips 80.

Now that the construction of cushion 10 according to the teachings of the present invention has been explained, the preferred uses and advantages of cushion 10 can be set forth and appreciated. Specifically, one preferred use of cushion 10 and support 14 according to the preferred teachings of the present invention as shown in FIG. 1 is for the user to kneel on cushion 10 with the portion of support 14 not covered by cushion 10 located intermediate the user and the equipment needing repair. It can then be appreciated that provisions 42 securely hold cushion 10 on support 14 to prevent cushion 10 from slipping or otherwise sliding while the user is kneeling thereon. Tools required for the repair of the equipment can then be lain on support 14 in front of cushion 10 where they are easy to reach and see and are kept clean. Also, the tools are not as likely to be mixed with gravel or other loose coverings of the work area and are not as likely to be left behind when the repair has been completed. It is possible that support 14 could include suitable provisions for attaching at least some of the tools frequently utilized by the user to support 14 in front of cushion 10. Thus, such tools would be transportable with support 14 and cushion 10 to the repair site.

It can then be appreciated that the location and the preferred form of handle 78 according to the preferred teachings of the present invention is particularly advantageous. Specifically, handle 78 is positioned at top end 70 and specifically on the side of cushion 10 opposite to the portion of support 14 which is not covered by cushion 10. It can be appreciated that top end 70 is then located farthest away from the equipment needing repair and support 14 can be easily lifted to a vertical condition by simply pulling up on handle 78. Additionally, since support 14 is positioned on the ground, it is not necessary for the user to pry under an edge of support 14 to partially lift support 14 such as would be required to get fingers in a hand hole cut in support 14, with such a hand hole also being susceptible to plugging with snow or other loose cover from the work area. Rather, according to the preferred teachings of the present invention, the hand of the user can be easily inserted into rope handle 78 and simply pulled up to raise support 14 and cushion 10 into a vertical condition for transport.

In the other preferred form as shown in FIG. 3, cushion 10 and support 14 typically support the user laying upon cushion 10. Specifically, support 14 and cushion 10 secured thereto can be slid under the equipment to be repaired such as under the frame of a truck, boxcar, or the like, and the user can crawl under the equipment and upon cushion 10 and typically lay thereon working on the equipment overhead. It can then be appreciated that provisions 42 securely hold cushion 10 on support 14 to prevent cushion 10 from slipping or otherwise sliding while the user is laying or crawling thereon.

It can then be appreciated that the use of support 14 is particularly advantageous. First, support 14 protects cushion 10 from the ground, floor or other work area. Specifically, gravel, crushed rock, or other loose debris on the work area can have a tendency to cut or otherwise deform covering 22 and cushion 10 if placed directly thereon. Additionally, support 14 raises cushion 10 up from water, oil, and like debris upon the work area which can have a tendency to be absorbed by or adhere to cushion 10. Further, because of the increased mass of support 14 such as when formed of plywood, support 14 and cushion 10 secured thereto will have less of a tendency to slip or otherwise slide upon the work area than cushion 10 by itself or than a piece of cardboard or the like.

Due to its thinness, cushion 10 may be positioned on support 14 between sides 74 without bulkiness in a manner as shown in the drawings such that the user may kneel or lay thereon and without a significant increase in the overall height of support 14. Particularly, cushion 10 according to the teachings of the present invention may be marketed separately from support 14 for use separate from support 14 and/or can be removably secured to support 14. Cushion 10 is not required to be assembled to support 14 during its manufacture and does not require bolts or the like extending through yolks or other rigid attachment devices.

It should then be appreciated that provisions 40 and 42 are advantageous. Specifically, provisions 40 and 42 are flat, flexible, soft, and thin such that they do not provide raised projections or obstructions from support 14 when cushion 10 is removably secured to top surface 76 thereof. Further, as insulator 24 is located intermediate provisions 42 and 48 and strips 80 and the user supported on support 14, insulator 24 acts as a buffer to the limited increase in thickness resulting from provisions 42 and 48 and strips 80. Similarly, it can be appreciated that provisions 42 and 48 and strips 80 are located intermediate the top surface of support 14 and half 38 of covering 22 and thus do not extend over or from the periphery or half 36 of covering 22 and ends 70 and 72 and sides 74 of support 14 in its most preferred form. It can then be appreciated that snaps, yoke members, bolts and other attachment devices would provide raised projections from support 14 which would detract from the comfort when the user is kneeling, laying or otherwise supported thereon. Further, cushion 10 can be easily removed from support 14 without the use of tools simply by pulling on cushion 10 separating portions 44 and 46.

According to the preferred teachings of the present invention, layer 30 reflects the user's body heat back to the user and similarly, layer 32 reflects away the cold from support 14 or the like. This feature maximizes the use of the user's body heat in keeping warm. Further, with layers 26 and 28 of insulator 24, this feature also reduces the loss of the user's body heat such that the user's body heat is retained.

Covering 22 according to the preferred teachings of the present invention adds comfort to the user as it covers insulator 24 and specifically layer 30 thereof such that layer 30 does not directly engage the user's skin and clothing as layers 30 and 32 of insulator 24 may be abrasive to the user's skin and outer garments. Further, covering 22 can absorb any perspiration of the user and keeps insulator 24 from sticking to the user's skin from such perspiration to provide added comfort. Additionally, due to the releasably closable nature of open top 34, covering 22 may be cleaned after insulator 24 is removed from interior 35 thereof.

Cushion 10 according to the teachings of the present invention protects the back, buttocks, and legs of the user supported thereon by kneeling or laying thereon from cold objects, winds and dampness and to thus keep these parts of the body warm, dry, and comfortable. Thus, cold chills are stopped from entering the user's back, buttocks, and legs to avoid painful, sore, aching muscles induced by cold chills. This is especially important because the user is adjacent cold floors, ground, or like work areas. Further, due to its lightweight, thin, and flexible nature, cushion 10 according to the teachings of the present invention may be comfortably utilized without restricting body movement. It can then be appreciated that cushion 10 according to the teachings of the present invention provides a synergistic combination for solving the problems associated with cold, damp, and/or windy conditions and/or associated with kneeling and/or laying on the relatively hard surface of support 14 and/or the work area.

When not attached to support 14, cushion 10 can be easily stored in a flat condition or, due to its flexible nature, in either a folded or rolled condition or the like. In this regard, cushion 10 of FIG. 3 is particularly advantageous as it can be stored in a flat condition behind the seat of the repair truck or other vehicle when not in use. Thus, cushion 10 according to the preferred teachings of the present invention is always available whenever the vehicle is taken to a field location for repair of equipment.

Alternately, cushion 10 can be stored according to the teachings of the present invention while attached to support 14. In this regard, support 14 can be removably attached to a wall in a vertical condition by any suitable means such as by hanging support 14 by handle 78 from a nail or other type of hook. Likewise, handle 78 could be hooked on a welding dolly or other cart including other repair equipment which is wheeled to the repair location. It can then be appreciated that since cushion 10 is removably secured to support 14 by provision 42, cushion 10 will also be in a vertical condition against support 14. In such a position, cushion 10 will allow snow, moisture, or other liquids absorbed in or adhered to cushion 10 to fall or drain therefrom under gravitational forces and/or to evaporate or otherwise be removed from cushion 10. Additionally, cushion 10 and support 14 are then located at an out-of-the-way location which is highly visible and accessible allowing them to be quickly and easily removed when desired.

Although in the most preferred form of the present invention cushion 10 has been shown and described for releasable securement to support 14, cushion 10 according to the preferred teachings of the present invention may be utilized separately. Specifically, often kneeling or laying on a hard work area such as a concrete slab, metal decking, a roadway, or the like is quite tiring and hard on the body. When support 14 is not available such as when it is not convenient to transport it to the repair location due to its size and weight, cushion 10 can be simply placed upon the ground, floor or other work area with the user kneeling or laying thereon. Thus, many of the advantages of cushion 10 set forth previously as well as others can be obtained according to the teachings of the present invention. However, without support 14, cushion 10 may have a tendency to slip or otherwise slide upon the ground, floor or other work area especially if such area is slippery such as being covered with an oil film, ice, snow, or the like. This can be disastrous especially when the user is getting initially positioned on cushion 10. It can then be appreciated that abrasive strips 80 are especially effective in preventing cushion 10 from slipping or otherwise sliding upon the ground, floor or other work area when utilized without support 14, portion 44 can simply engage the work area without detriment. In fact, the flexibility of cushion 10 and of strips 80 is particularly advantageous in following the contour of the work area to maximize the area that strips 80 abut with the work area. Thus, cushion 10 is able to be utilized with or without support 14 as desired and depending upon the particular circumstances of the repair site.

Likewise, although in the most preferred form two air cell material insulators 24 are utilized, one or both layers of insulators 24 could be formed of other materials such as low density expanded ethylene-vinyl acetate copolymers such as sold under the trademark EVALITE by Monarch Rubber Co. In the most preferred form, one layer of each is provided with the air cell material being located intermediate support 14 and the other layer of expanded copolymer material, which is white in the preferred form to reflect rather than absorb heat. Such an arrangement creates a space from the reflective layers 30 and 32 to enhance the heat reflection thereby and enhances the elasticity of the air cell material.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A device for supporting a user upon a work area comprising, in combination: a rigid, planar support having a top end, a bottom end, and first and second sides around a top surface, with the user being supported on the top surface of the rigid, planar support; a cushion of a size complementary to the top surface of the rigid, planar support, with the cushion having a length generally equal to the distance between the first and second sides and a width substantially less than the distance between the top and bottom ends and including an upper surface and a lower surface, with the user being supported on the upper surface of the cushion and the lower surface being on the opposite side of the cushion than the upper surface; means for releasably securing the lower surface of the cushion to the top surface of the rigid, planar support with the cushion located parallel and adjacent to the top end and spaced from and parallel to the bottom end and with the cushion being intermediate the user and the rigid, planar support when the user is kneeling upon the rigid, planar support; and a flexible abrasive strip separate from the releasably securing means and secured to the lower surface of the cushion, with the flexible abrasive strip directly and in a non-securing but non-slip manner abrasively abutting the top surface of the rigid, planar support when the cushion is secured to the rigid, planar support and the work area when the cushion is released from the rigid, planar support to prevent slipping of the cushion upon the work area.

2. The device of claim 1 further comprising, in combination: a handle secured to the rigid, planar support adjacent the top end.

3. The device of claim 2 wherein the handle comprises an elongated flaccid member extending through at least first and second apertures formed in the rigid, planar support adjacent to the top end.

4. The device of claim 3 wherein the releasably securing means comprises first and second fastener portions secured to the lower surface of the cushion in a spaced parallel arrangement and spaced from the flexible abrasive strip; and third and fourth fastener portions directly secured to the top surface of the rigid, planar support for removable interconnection to the first and second fastener portions, with the fastener portions being flat and thin and being free of projections which would detract from the comfort to the user supported on the rigid, planar support and upon the cushion, with the abrasive strip being intermediate the first and second fastener portions.

5. The device of claim 4 wherein the third and fourth fastener portions are secured to the rigid, planar support by double-sided adhesive tape having a first adhesive side secured to the second fastener portion and a second adhesive side covered by a removable protective covering sheet and for securing to the top surface of the rigid, planar support.

6. The device of claim 1 wherein the cushion comprises, in combination: a flexible insulator received within a flexible covering; and wherein the releasably securing means comprises means for releasably securing the flexible covering to the top surface of the rigid, planar support, with the releasably securing means being independent of the flexible insulator.

7. The device of claim 1 wherein the releasably securing means comprises first and second fastener portions secured to the lower surface of the cushion in a spaced parallel arrangement and spaced from the flexible abrasive strip; and third and fourth fastener portions directly secured to the top surface of the rigid, planar support for removable interconnection to the first and second fastener portions, with the fastener portions being flat and thin and being free of projections which would detract from the comfort to the user supported on the rigid, planar support and upon the cushion, with the abrasive strip being intermediate the first and second fastener portions.

8. The device of claim 7 wherein the third and fourth fastener portions are secured to the rigid, planar support by double-sided adhesive tape having a first adhesive side secured to the second fastener portion and a second adhesive side covered by a removable protective covering sheet and for securing to the top surface of the rigid, planar support.

9. A device for supporting a user upon a work area comprising, in combination: a rigid, planar support having a top end, a bottom end, and first and second sides around a top surface, with the user being supported on the top surface of the rigid, planar support; a cushion of a size complementary to the top surface of the rigid, planar support, with the cushion including an upper surface and a lower surface, with the user being supported on the upper surface of the cushion and the lower surface being on the opposite side of the cushion than the upper surface; means for releasably securing the lower surface of the cushion to the top surface of the rigid, planar support with the cushion being intermediate the user and the rigid, planar support when the user is supported upon the rigid, planar support; and at least a first flexible abrasive strip separate from the releasably securing means and secured to the lower surface of the cushion, with the flexible abrasive strip directly and in a non-securing but non-slip manner abrasively abutting the top surface of the rigid, planar support when the cushion is secured to the rigid, planar support and the work area when the cushion is released from the rigid, planar support to prevent slipping of the cushion upon the work area.

10. The device of claim 9 wherein the releasably securing means comprises first and second fastener portions secured to the lower surface of the cushion in a spaced parallel arrangement and spaced from the flexible abrasive strip; and third and fourth fastener portions directly secured to the top surface of the rigid, planar support for removable interconnection to the first and second fastener portions, with the fastener portions being flat and thin and being free of projections which would detract from the comfort to the user supported on the rigid, planar support and upon the cushion, with the abrasive strip being intermediate the first and second fastener portions.

11. The device of claim 10 wherein the cushion has a length generally equal to the distance between the first and second sides and a width substantially less than the distance between the top and bottom ends and with the cushion located parallel and adjacent to the top end and spaced from and parallel to the bottom end.

12. The device of claim 10 wherein the first and second fastener portions have elongated lengths and the abrasive strip has an elongated length parallel to the elongated lengths of the first and second fastener portions.

13. The device of claim 10 wherein the cushion includes at least a first portion and a second portion foldable about a first fold line; and wherein the device further comprises, in combination: a second abrasive strip secured to the lower surface of the second portion of the cushion, with the second abrasive strip having an elongated length parallel to the first fold line, with the first abrasive strip secured to the lower surface of the first portion of the cushion and having an elongated length parallel to the first fold line.

14. The device of claim 13 wherein the cushion includes a third portion foldable about a second fold line to the first portion, with the second fold line being parallel to the first fold line; and wherein the device further comprises, in combination: a third abrasive strip secured to the lower surface of the third portion of the cushion and having an elongated length parallel to the second fold line.

15. The device of claim 14 wherein the cushion has a size generally equal to the top surface of the rigid, planar support.

16. The device of claim 14 wherein the first fastener portion is secured to the second portion and the second fastener portion is secured to the third portion, with the first and second fastener portions having elongated lengths parallel to the abrasive strips.

* * * * *